United States Patent Office 3,636,181
Patented Jan. 18, 1972

3,636,181
DIFUNCTIONAL MONOMERS FROM VINYL SUBSTITUTED BENZYL CHLORIDES AND CHLOROMETHYL BUTADIENE AND POLYMERS PREPARED THEREFROM
Giffin D. Jones and Mary R. Thomas, Midland, Mich., assignors to The Dow Chemical Company, Midland, Mich.
No Drawing. Filed Apr. 28, 1969, Ser. No. 820,022
Int. Cl. C07c *15/10*
U.S. Cl. 260—669
6 Claims

ABSTRACT OF THE DISCLOSURE

Difunctional monomers of the type 2-(vinylphenethyl)-1,3-butadiene are prepared by making the Grignard of the vinyl benzyl chloride compounds followed by inverse Grignard coupling with 2-chloromethyl 1,3-butadiene. The monomers are useful in making graft, branched or crosslinked polymers and copolymers.

BACKGROUND OF THE INVENTION

Graft, branched or crosslinked polymers or copolymers are desirable in many applications in modern technology. Monomers of the type 2-(vinylphenethyl)-1,3-butadiene are difunctional and could be useful in producing all three types of polymers and copolymers.

SUMMARY OF THE INVENTION

In accordance with this invention difunctional monomers of the type 2-(vinylphenethyl)-1,3-butadiene are synthesized by making the Grignard of the corresponding vinyl benzyl chloride compounds followed by inverse Grignard coupling with 2-chloromethyl 1,3-butadiene. The resulting monomers are particularly useful in anionic polymerization with alkyl lithium catalysts because of the difference in the reactivity ratios of the diene portion and the styryl portion of the molecule. The monomers can also be utilized to produce new polymers with free-radical catalysts.

The preferred monomers of this invention have the general formula

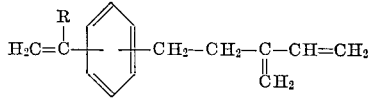

wherein R is hydrogen or methyl.

These compounds are preferably prepared by dissolving the benzyl chloride compound in ether, e.g. tetrahydrofuran or isopropyl ether, but preferably diethyl ether, and adding the resulting solution to finely divided magnesium in the absence of oxygen and water at a rate such that the ether is maintained at a steady reflux. The resulting Grignard solution, after filtering off excess magnesium and MgCl₂, is then added to a solution of the chloromethyl butadiene in ether and the mixture heated to reflux for 24 to 48 hours. To terminate the coupling reaction the remaining Grignard is destroyed such as by the addition of saturated ammonium chloride in water at 25° C., thereby complexing the water with the salt NH₄Cl·MgCl₂·6H₂O leaving the ether phase dry. Thus, the ether containing the product is simply decanted. The ether is subsequently removed from the product by evaporation. To remove the last traces of ether, since such traces vary the selectivity ratios in n-butyllithium catalyzed polymerizations, a low-boiling hydrocarbon such as hexane may be added to the product and subsequently flashed off.

The reaction is preferably carried out with about one mole equivalent of Grignard reagent to about one molar equivalent of 2-chloromethyl-1,3-butadiene. The boiling point of the solvent or monomer determines the temperature of the reaction. Refluxing of the reaction mixture is preferred. The lower temperature employed is generally determined by the rate of reaction obtained or desired and is typically about room temperature or slightly above, e.g. 20° to 40° C.

The difunctional monomers of this invention are readily utilized in making novel copolymers having pendant styrene or diene groups randomly distributed along the copolymer chain. For example, the dissolution of isoprene and a difunctional monomer of this invention in a hydrocarbon solvent with the addition of an organolithium catalyst results in the formation of a copolymer of isoprene having pendant styrene groups randomly distributed along the copolymer chain. In a second step one can use an alkenyl aromatic compound to form a graft copolymer with the so-prepared random copolymer by polymerization under anionic polymerization conditions.

By the term "alkenyl aromatic resin" is meant a solid polymer of one or more polymerizable alkenyl aromatic compounds. The polymer or copolymer comprises in chemically combined form, at least 70 percent by weight of at least one compound having the general formula

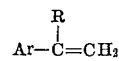

wherein Ar represents an aromatic hydrocarbon radical of the benzene series and R is hydrogen or methyl. Examples of such alkenyl aromatic resins are the solid homopolymers of styrene, α-methyl styrene, o-, m-, or p-methyl styrene, ar-ethyl styrene, ar-vinyl xylene and the solid copolymers of two or more of such alkenyl aromatic compounds with minor amounts of other readily polymerizable olefinic compounds such as, for example, methyl methacrylate or acrylonitrile.

To prepare random copolymers of styrene with the difunctional monomers of this invention tetrahydrofuran is employed as the solvent. Upon addition of an organolithium catalyst anionic polymerization begins and a copolymer of styrene having pendant diene groups randomly distributed along the copolymer chain is formed. In a second step the so-prepared random copolymer may be employed to make a graft copolymer of, for example, polyisoprene on a polystyrene backbone by polymerization under anionic polymerization conditions.

The invention is further illustrated by the following examples.

EXAMPLE I

Preparation of 2-(3-vinylphenethyl)-1,3-butadiene and 2-(4-vinylphenethyl)-1,3-butadiene A charge of 37 ml. of vinylbenzyl chloride that is 70% meta and 30% para in substitution is dissolved in 125 ml. diethyl ether and is added slowly to 7.54 g. magnesium filings in a stirred nitrogen purged, round bottom flask. The temperature of the reaction is controlled by the refluxing of the ether. When the refluxing subsides, the reaction to Grignard reagent is complete. The solution containing the vinylbenzyl magnesium chloride is syphoned into a nitrogen purged, graduated cylinder fitted with stopcocks at each end. An aliquot of solution is removed, hydrolyzed with acid and titrated to determine the Grignard reagent concentration.

A charge of 17 g. of 2-chloromethyl-1,3-butadiene is dissolved in diethyl ether and drained into a stirred nitrogen purged, round bottom flask. Slightly more than an equimolar amount, 145 ml. of the 1.64 M vinylbenzyl magnesium chloride solution is slowly added to the flask. The mixture is stirred and heated at 35° C. for 22 hours.

Saturated NH₄Cl solution in water at 25° C. is added to the solution to hydrolyze the remaining Grignard reagents and to precipitate the MgCl₂. The ether containing the product is decanted and the ether flashed off.

The products, identified by NMR, infrared and mass spectrometry, were 2-(3-vinylphenethyl)-1,3-butadiene and 2-(4-vinylphenethyl)-1,3-butadiene in a 70–30% ratio and comprising 80% of the final product.

Carbon-hydrogen analysis on two separate samples was as follows:

|  | Percent C | Percent H |
| --- | --- | --- |
| Fraction: |  |  |
| 1 | 91.6 | 8.54 |
| 2 | 90.7 | 7.86 |
| Calculated | 91.3 | 8.7 |

EXAMPLE II

In a similar manner 2-(2-vinylphenethyl)-1,3-butadiene was prepared by making the Grignard of o-vinyl-benzyl chloride and coupling with 2-chloromethyl-1,3-butadiene. Carbon-hydrogen were as follows:

|  | Percent C | Percent H |
| --- | --- | --- |
| Fraction: |  |  |
| 1 | 90.9 | 8.45 |
| 2 | 91.6 | 8.86 |
| Calculated | 91.3 | 8.7 |

EXAMPLE III

Following the same procedures but employing p-isopropenyl benzyl chloride resulted in the formation of 2-(4-isopropenyl phenethyl)-1,3-butadiene. Mass spec analysis gave the correct fragmentation pattern. Carbonhydrogen analysis were:

|  | Percent C | Percent H |
| --- | --- | --- |
| Fraction: |  |  |
| 1 | 90.7 | 9.08 |
| 2 | 90.3 | 10.0 |
| Calculated | 90.9 | 9.1 |

EXAMPLE IV

The production of a graft copolymer of polystyrene on a polyisoprene backbone.

Step 1.—A charge of 0.01 ml. of 2-(3- and 4-vinylphenethyl)-1,3-butadiene is dissolved in 100 ml. toluene in a nitrogen purged, stirred round bottom flask. The solution is degassed with a slow stream of nitrogen through the solution and 5 ml. of isoprene monomer is added. The polymerization of the isoprene and the difunctional monomer is started with 0.5 ml. of 0.5 m. n-butyllithium. The solution is held at 50° C. for 45 minutes or until 90% conversion to polymer is reached after which the reaction is killed with 0.005 ml. methanol.

Step. 2—Styrene monomer, 20 ml., is added and n-butyllithium is added to overcome the methanol and to start the polymerization. The polymerization, when complete, is terminated with methanol. An antioxidant, 2,6-di-tertiarybutyl-4-methyl phenol is added to prevent crosslinking of the rubber. Gel permeation chromatography indicates polystyrene grafted on the isoprene backbone.

EXAMPLE V

The production of a graft copolymer of polyisoprene on a polystyrene backbone.

Step 1.—A charge of 0.01 ml. of 2-(2-vinylphenethyl)-1,3-butadiene is dissolved in 100 ml. tetrahydrofuran in a nitrogen purged, stirred round bottom flask. The solution is degassed with a slow stream of nitrogen through the solution and 5 ml. of styrene monomer is added. The polymerization of the styrene and the difunctional monomer is started with 0.5 ml. of 0.5 m. n-butyllithium. The solution is held at 50° C. for 45 minutes or until 70% conversion to polymer is reached after which the reaction is killed with 0.005 ml. methanol.

Step 2.—Isoprene monomer, 20 ml., is added and n-butyllithium is added to overcome the methanol and to start the polymerization. The polymerization, when complete, is terminated with methanol. An antioxidant, 2,6-ditertiarybutyl-4-methyl phenol is added to prevent crosslinking of the rubber. Gel permeation chromatography indicates polyisoprene grafted on the polystyrene backbone.

Various modifications may be made in the present invention without departing from the spirit or scope thereof and it is understood that we limit ourselves only as defined in the appended claims.

We claim:
1. A compound having the formula

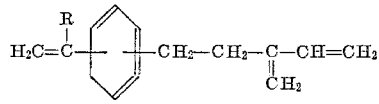

wherein R is hydrogen or methyl.

2. A compound in accordance with claim 1 which is 2-(3-vinylphenethyl)-1,3-butadiene.

3. A compound in accordance with claim 1 which is 2-(4-vinylphenethyl)-1,3-butadiene.

4. A compound in accordance with claim 1 which is 2-(2-vinylphenethyl)-1,3-butadiene.

5. A compound in accordance with claim 1 which is 2-(4-isopropenyl phenethyl)-1,3-butadiene.

6. Process for making the compounds of claim 1 which comprises forming the Grignard of the corresponding vinyl benzyl chloride compound and thereafter coupling said Grignard with 2-chloromethyl-1,3-butadiene.

References Cited

UNITED STATES PATENTS

| 3,184,516 | 5/1965 | Chechak et al. | 260—669 X |
| 3,424,789 | 1/1969 | Schultz et al. | 260—669 |
| 3,502,736 | 3/1970 | Sato et al. | 260—669 |

CURTIS R. DAVIS, Primary Examiner

U.S. Cl. X.R.

260—82.1, 880